United States Patent
Ehrlich et al.

(10) Patent No.: US 9,996,303 B2
(45) Date of Patent: Jun. 12, 2018

(54) HYBRID-HDD THAT GIVES UP OLD NAND DATA AT THE LAST MOMENT

(71) Applicant: KABUSHIKI KAISHA TOSHIBA, Tokyo (JP)

(72) Inventors: Richard M. Ehrlich, Saratoga, CA (US); Eric R. Dunn, Cupertino, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 647 days.

(21) Appl. No.: 14/273,427

(22) Filed: May 8, 2014

(65) Prior Publication Data
US 2015/0324121 A1 Nov. 12, 2015

(51) Int. Cl.
*G06F 3/06* (2006.01)
*G06F 12/02* (2006.01)

(52) U.S. Cl.
CPC .............. *G06F 3/068* (2013.01); *G06F 3/061* (2013.01); *G06F 3/065* (2013.01); *G06F 3/0649* (2013.01); *G06F 3/0652* (2013.01); *G06F 3/0655* (2013.01); *G06F 3/0679* (2013.01); *G06F 12/0253* (2013.01); *G06F 2206/1014* (2013.01)

(58) Field of Classification Search
CPC .......... G06F 3/06; G06F 3/054; G06F 3/0652; G06F 3/0655; G06F 3/0679; G06F 3/068; G06F 2206/1014; G06F 12/0246
USPC ........................................................ 711/103
See application file for complete search history.

(56) References Cited

U.S. PATENT DOCUMENTS

| | | | | |
|---|---|---|---|---|
| 7,450,420 B2* | 11/2008 | Sinclair | .................. | G06F 3/0605 365/185.02 |
| 7,552,271 B2* | 6/2009 | Sinclair | ............... | G06F 12/0246 711/103 |
| 7,743,203 B2* | 6/2010 | France | ................ | G06F 12/0246 365/185.29 |
| 9,092,316 B2* | 7/2015 | Iliadis | ...................... | G06F 12/02 |
| 2006/0047889 A1* | 3/2006 | Sasaki | ................. | G06F 12/0246 711/103 |
| 2007/0033328 A1* | 2/2007 | Sinclair | ................. | G06F 3/0605 711/103 |
| 2007/0033331 A1* | 2/2007 | Sinclair | ............... | G06F 12/0246 711/103 |
| 2007/0033332 A1* | 2/2007 | Sinclair | ............... | G06F 12/0246 711/103 |

(Continued)

*Primary Examiner* — Midys Rojas
(74) *Attorney, Agent, or Firm* — Patterson & Sheridan, LLP (57) ABSTRACT

A method and a system are provided for improving performance of a hybrid drive including a non-volatile semiconductor memory device partitioned into blocks, each of the blocks containing a plurality of sectors, and a magnetic storage device. Performance of the hybrid drive is improved by tracking data types of each sector stored in the blocks, the data types including a first data type, which is data that is unconditionally available for host accesses, a second data type, which is data that is conditionally available for host accesses, and a third data type, which is data unavailable for host accesses, and collecting erasable blocks from the blocks of the non-volatile semiconductor memory device according to the data types. The erasable blocks include a block that contains data of the second data type, such that the host may access from this block even though this block is erasable.

18 Claims, 8 Drawing Sheets

(56) References Cited

U.S. PATENT DOCUMENTS

| | | | |
|---|---|---|---|
| 2010/0122047 A1* | 5/2010 | Vasilievna | G06F 3/0623 |
| | | | 711/155 |
| 2010/0185804 A1 | 7/2010 | Omizo et al. | |
| 2011/0145473 A1* | 6/2011 | Maheshwari | G06F 12/0866 |
| | | | 711/103 |
| 2011/0252181 A1 | 10/2011 | Ouye et al. | |
| 2012/0005405 A1* | 1/2012 | Wu | G06F 12/0253 |
| | | | 711/103 |
| 2012/0005406 A1* | 1/2012 | Hutchison | G06F 12/0246 |
| | | | 711/103 |
| 2012/0297123 A1* | 11/2012 | Cherubini | G06F 12/0246 |
| | | | 711/103 |
| 2012/0303865 A1 | 11/2012 | Hars | |
| 2013/0024609 A1* | 1/2013 | Gorobets | G06F 12/0246 |
| | | | 711/103 |
| 2013/0166818 A1* | 6/2013 | Sela | G06F 12/0246 |
| | | | 711/103 |
| 2014/0047165 A1* | 2/2014 | Nemazie | G06F 12/0246 |
| | | | 711/103 |

* cited by examiner

HYBRID-HDD THAT GIVES UP OLD NAND DATA AT THE LAST MOMENT

BACKGROUND

Incorporating today's flash memory devices, such as NAND flash memory, to a hard disk system can offer many performance advantages, because they can help avoid trips to the rotating storage. If host read data resides in the flash memory, the data can be returned quickly from the flash memory, instead of the rotating storage. In addition, host write data can be quickly committed to the flash memory and acknowledged to the host, as the flash memory is itself persistent storage. However, the performance advantage of the flash memory is only available if the host read data resides in flash memory or if there are free blocks to accept the host write data. Thus, techniques for managing the data in flash memory become important in order to realize the performance advantage. When the management technique operates in a manner that does not utilize the full capacity of the flash memory, then some of the performance advantage that is possible is not realized.

An important aspect of managing flash memory includes observing the operational characteristics of this type of memory. A flash memory device is organized as sectors of a certain size, such as 512, 2048, or 4096 or more bytes, for reading operations and writing operations, but as blocks, consisting of 32 or 64 sectors, for erasing operations, which are necessary before a write operation in the block is possible. In addition, in a flash memory device there is a limit on the number of erase and write cycles (also sometimes referred to as program cycles). Thus, management of the flash memory device should attempt to keep often-accessed data in the flash memory device, provide erased blocks to accept new write data from a host using the disk system, and to minimize the number of erase and write cycles.

SUMMARY

A method and a system are provided for improving performance of a hybrid drive including a non-volatile semiconductor memory device partitioned into blocks, each of the blocks containing a plurality of sectors, and a magnetic storage device. Performance of the hybrid drive is improved by tracking data types of each sector stored in the blocks, the data types including a first data type, which is data that is unconditionally available for host accesses, a second data type, which is data that is conditionally available for host accesses, and a third data type, which is data unavailable for host accesses, and collecting erasable blocks from the blocks of the non-volatile semiconductor memory device according to the data types. The erasable blocks include a block that contains data of the second data type, such that the host may access data from this block even though this block is erasable. Non-volatile semiconductor memory systems known in the art typically consist of only two data types: (1) data that is unconditionally available for host accesses (sometimes referred to by those skilled in the art as "valid"); and (2) data that is unavailable for host accesses (sometimes referred to by those skilled in the art as "invalid"). The improved method and system disclosed herein leverage the fact that the non-volatile semiconductor memory is part of a hybrid system (so that it does not need to contain all of the host's data) to introduce a third data type: (3) data that is conditionally available for host accesses, but could be erased quickly if the associated blocks are needed to contain new data.

DETAILED DESCRIPTION

Figure 1:
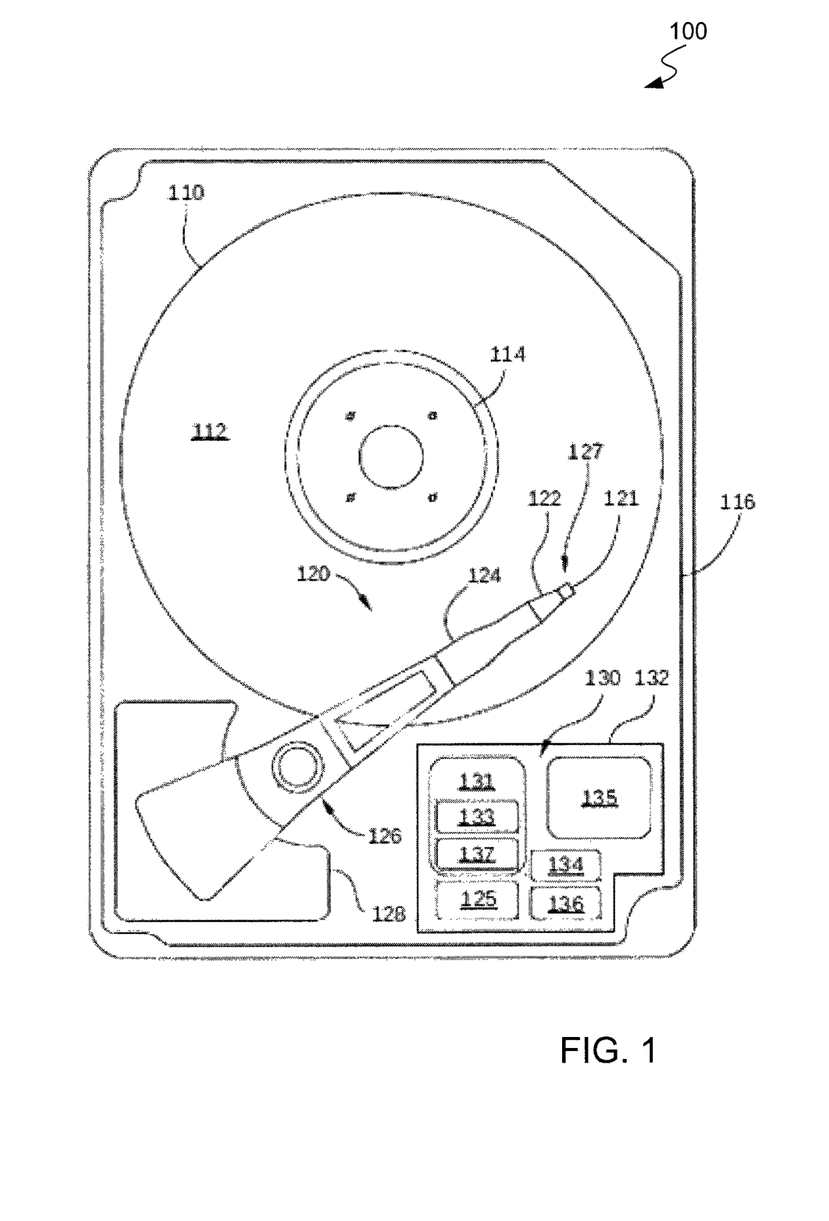
FIG. 1 is a schematic view of a hybrid drive according to an embodiment.

FIG. 1 is a schematic view of a hybrid drive according to an embodiment. For clarity, hybrid drive 100 is illustrated without a top cover. Hybrid drive 100 includes at least one magnetic disk 110 that is rotated by a spindle motor 114 and includes a plurality of concentric data storage tracks. Spindle motor 114 is mounted on a base plate 116. An actuator arm assembly 120 is also mounted on base plate 116, and has a slider 121 mounted on a flexure arm 122 with a read/write head 127 that reads data from and writes data to the data storage tracks. Flexure arm 122 is attached to an actuator arm 124 that rotates about a bearing assembly 126. Voice coil motor 128 moves slider 121 relative to magnetic disk 110, thereby positioning read/write head 127 over the desired concentric data storage track disposed on the surface 112 of magnetic disk 110. Spindle motor 114, read/write head 127, and voice coil motor 128 are controlled by electronic circuits 130, which are mounted on a printed circuit board 132. Electronic circuits 130 include a read/write channel 137, a microprocessor-based controller 133, random access memory (RAM) 134 (which may be a dynamic RAM and can be used as a data buffer), and a flash memory device 135 and flash manager device 136. In some embodiments, read/write channel 137 and microprocessor-based controller 133 are included in a single chip, such as a system-on-chip 131. In some embodiments, hybrid drive 100 may further include a motor-driver chip 125, which accepts commands from microprocessor-based controller 133 and drives both spindle motor 114 and voice coil motor 128.

For clarity, hybrid drive 100 is illustrated with a single magnetic disk 110 and a single actuator arm assembly 120. Hybrid drive 100 may also include multiple magnetic disks and multiple actuator arm assemblies. In addition, each side of magnetic disk 110 may have an associated read/write head coupled to a flexure arm.

When data are transferred to or from magnetic disk 110, actuator arm assembly 120 sweeps an arc between an inner diameter (ID) and an outer diameter (OD) of magnetic disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to magnetic disk 110. Voice coil motor 128 is coupled with a servo system known in the art that uses the positioning data read from servo wedges on magnetic disk 110 by read/write head 127 to determine the position of read/write head 127 over a specific data storage track. The servo system determines an appropriate current to drive through the voice coil of voice coil motor 128, and drives said current using a current driver and associated circuitry.

Hybrid drive 100 is configured as a hybrid drive, in which nonvolatile data storage includes a magnetic disk 110 and a flash memory device 135. In a hybrid drive, nonvolatile memory, such as flash memory device 135, supplements the spinning magnetic disk 110 to provide faster boot, hibernate, resume and other data read-write operations, as well as lower power consumption. Such a hybrid drive configuration is particularly advantageous for battery operated computer systems, such as mobile computers or other mobile computing devices. In a preferred embodiment, flash memory device 135 is a nonvolatile storage medium, such as a NAND flash chip, which can be electrically erased and reprogrammed, and is sized to supplement magnetic disk 110 in hybrid drive 100 as a nonvolatile storage medium. For example, in some embodiments, flash memory device 135 has data storage capacity that is orders of magnitude larger than RAM 134, e.g., gigabytes (GB) vs. megabytes (MB).

Figure 2:
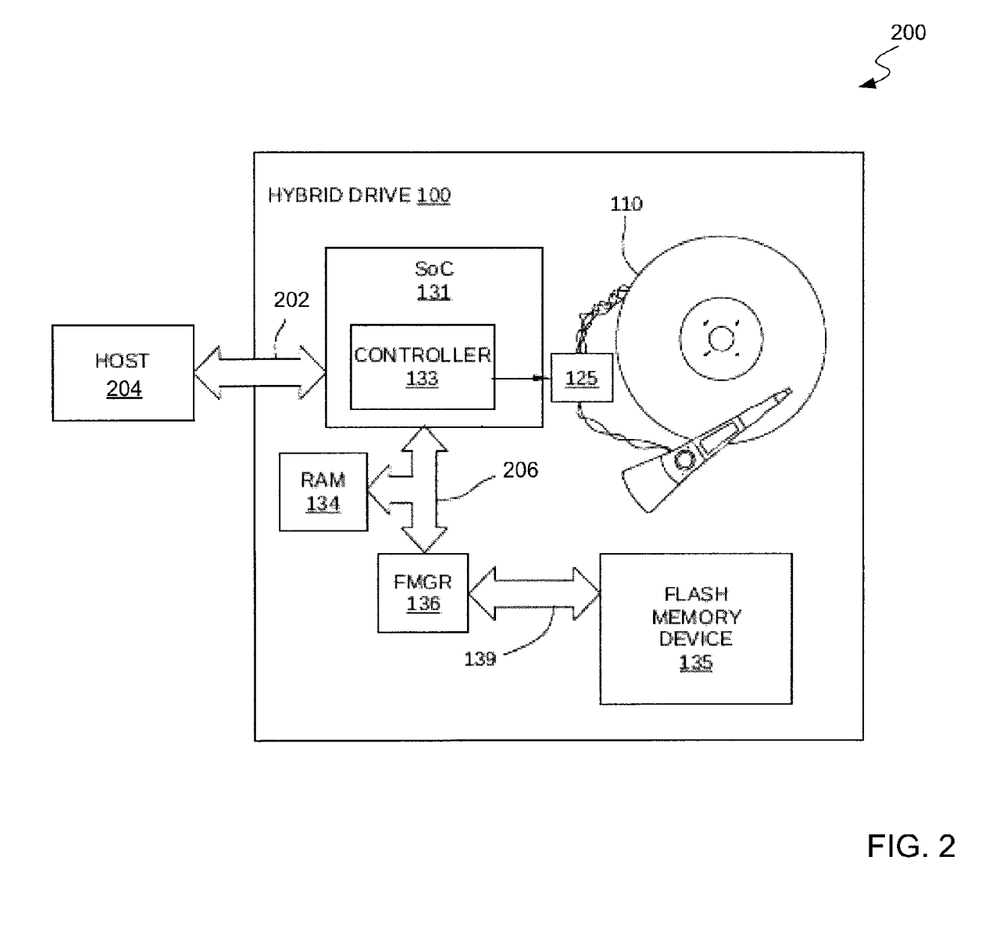
FIG. 2 illustrates an operational diagram of the hybrid drive according to the embodiment.

FIG. 2 illustrates an operational diagram 200 of hybrid drive 100 with elements of electronic circuits 130 shown configured according to one embodiment. As shown, hybrid drive 100 includes RAM 134, flash memory device 135, a flash manager device 136, system-on-chip 131, and a high-speed data path 206. Hybrid drive 100 is connected to a host 204, such as a host computer, via a host interface 202, such as a serial advanced technology attachment (SATA) bus. While FIG. 2 shows the flash manager device 136 sharing the high-speed data path 206 with the RAM 134, it is also possible for the flash manager device 136 to have its own separate data path to the system-on-chip 131.

In the embodiment depicted in FIG. 2, flash manager device 136 controls interfacing of flash memory device 135 with high-speed data path 206 and is connected to flash memory device 135 via a NAND interface bus 139. System-on chip 131 includes microprocessor-based controller 133 and other hardware (including read/write channel 137) for controlling operation of hybrid drive 100, and is connected to RAM 134 and flash manager device 136 via high-speed data path 206. Microprocessor-based controller 133 is a control unit that may include one or more microcontrollers such as ARM microprocessors, a hybrid drive controller, and any control circuitry within hybrid drive 100. High-speed data path 206 is a high-speed bus known in the art, such as a double data rate (DDR) bus, a DDR2 bus, a DDR3 bus, or the like. In other embodiments, hybrid drive 100 may be configured with different data interfaces and buses other than those illustrated in FIG. 2.

In the embodiment depicted in FIG. 2, microprocessor-based controller 133, executes programs, including a logical block manager (shown in FIG. 3), which may be firmware loaded into RAM 134 for carrying out particular management functions of the system 100. In alternative embodiments, the functions of the logical block manager may be implemented in hardware. The logical block manager manages flash memory device 135 to hold blocks for read and write access via the host interface 202. In one version, one or more auxiliary structures, such as a list or a B+ tree, are stored in flash memory device 135 or the RAM 134 or both to aid in the management, including searching, of a large number of flash blocks.

Figure 3:
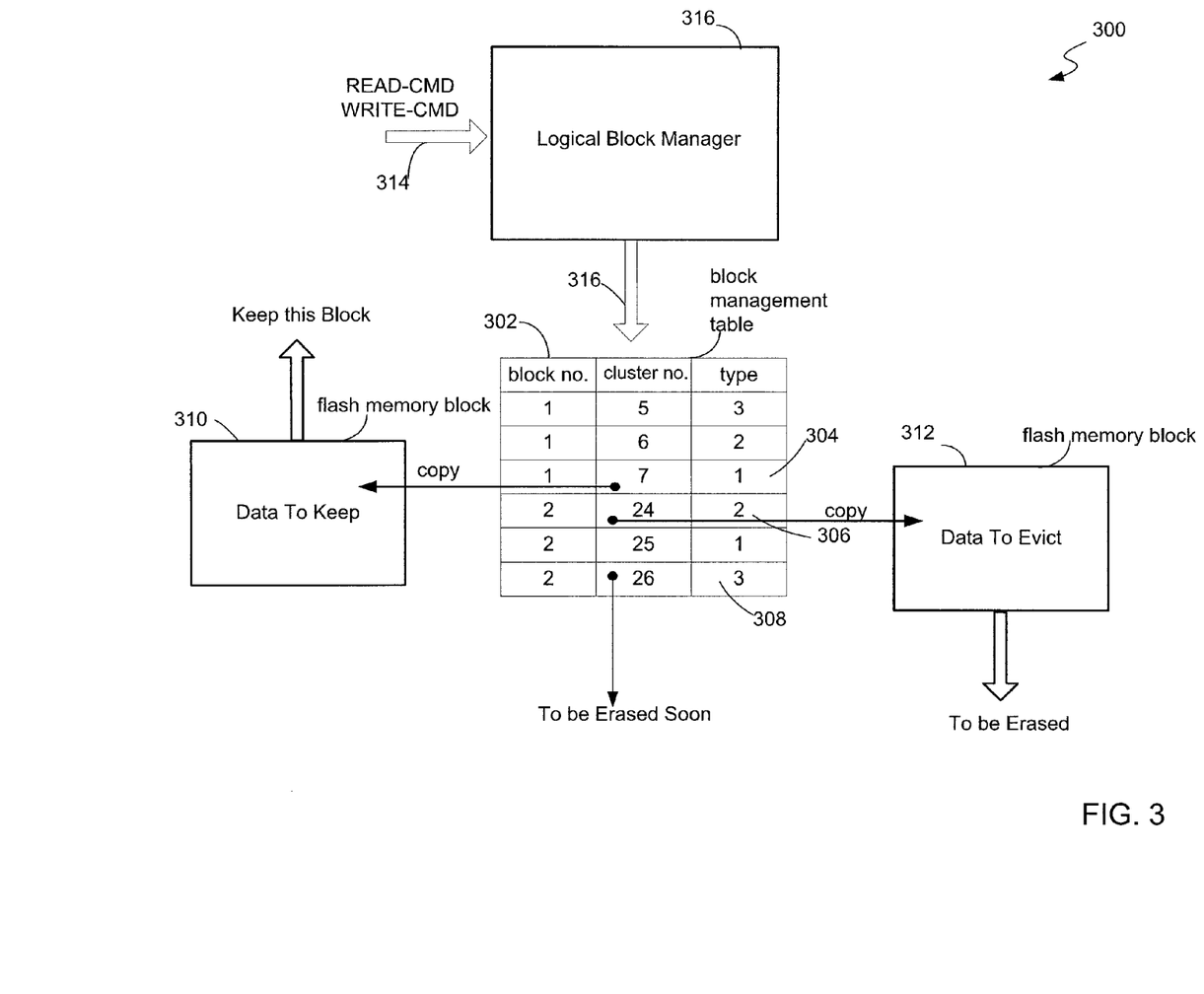
FIG. 3 is a schematic diagram depicting block management carried out using a block management table by a logical management module of the hybrid drive according to the embodiment.

FIG. 3 depicts a block management method 300 carried out by a logical block manager 316 using a block management table. The block management table resides in RAM 134 and/or in flash memory device 135 and includes flash blocks identified by block numbers, clusters, which comprise an integral number of sectors, within each flash block identified by cluster numbers, and the type of data in the cluster. Thus, a particular flash block can include multiple clusters, each of which contains a different type of data. In the embodiment depicted, there are three types of data. Type 1 data ("data to keep") 304 is data that is unconditionally available for host accesses, either because of high use or because the block is pinned in flash memory device 135. Type 2 data ("data to evict") 306 is data that is available for host accesses but only conditionally, because it could be removed from the block in which it resides so that the block can be reclaimed. Type 3 data ("obsolete data") 308 is data that is unavailable for host accesses because a newer version of the data resides elsewhere in flash memory device 135 or magnetic disk 110.

Logical block manager 316 is configured to move data among the flash blocks when performing several functions, including enabling recovery of blocks (also known as "garbage collection"), providing a newly erased block, and responding to a host read command, READ-CMD, or a host write command, WRITE-CMD 314. In addition, recognizing and managing type 2 blocks 306, rather than only type 1 and type 3 blocks, improves the write performance and the hit ratio of flash memory device 135, thereby improving performance of the hybrid drive 100. In the embodiment depicted in FIG. 3, the logical block manager copies type 1 data 304 to a separate flash memory block 310 and copies type 2 data 306 to another separate flash memory block 312. The remaining obsolete data 308 is then ready to be erased so that the block can be used again. Flash memory block 310 collects up as much type 1 data as possible from various other flash memory blocks, thus reducing the number of flash memory blocks being used. Similarly, flash memory block 312 collects up as much type 2 data from various other flash memory blocks as possible.

Figure 4:
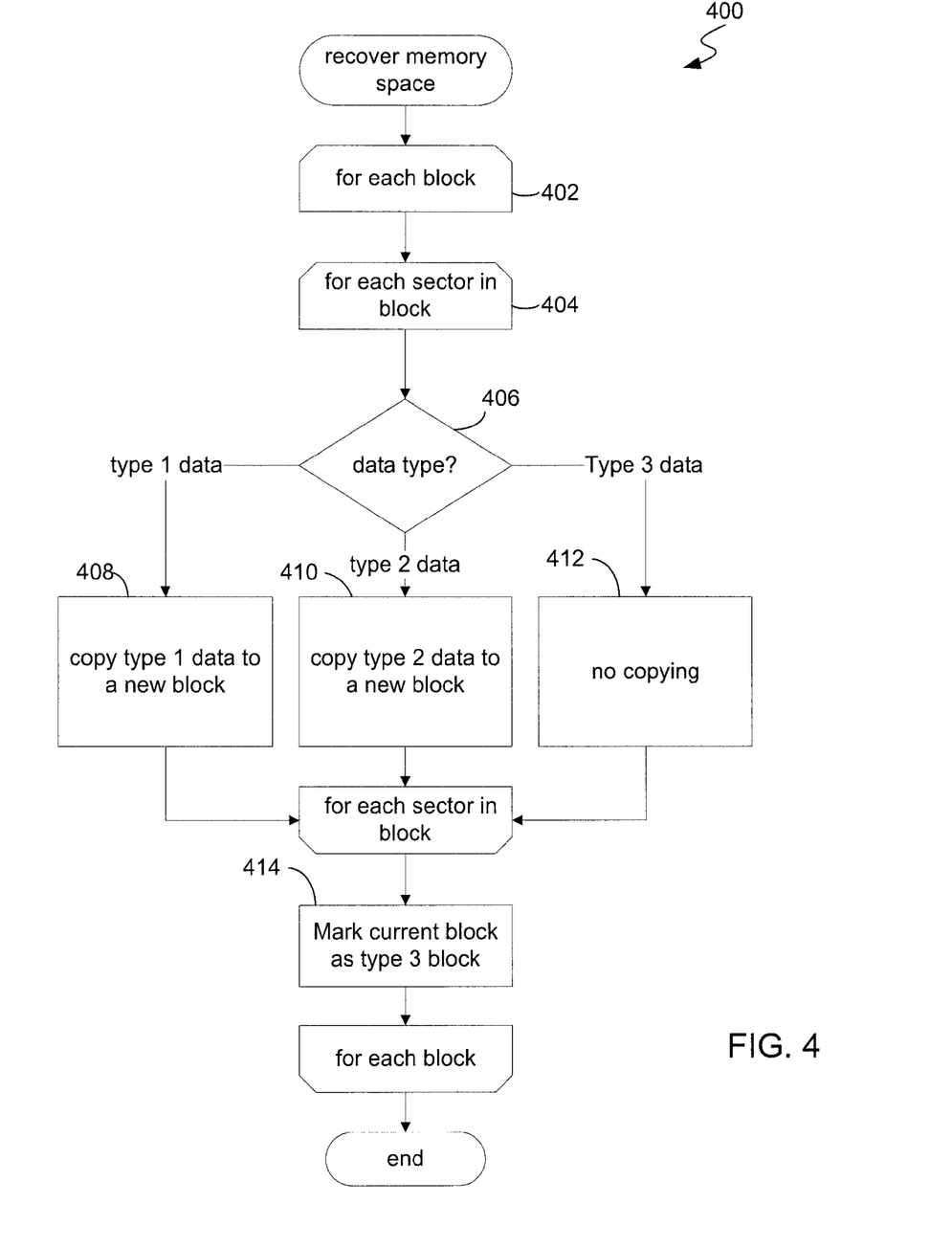
FIG. 4 depicts a flow chart of a method for recovering flash memory blocks in the hybrid drive according to a first embodiment.

FIG. 4 depicts a method 400 for recovering flash memory blocks in flash memory space, sometimes called "garbage collection," according to a first embodiment. In the block recovery process, sectors in each of a plurality of flash memory blocks are examined in order to increase the number of flash memory blocks that can be reused. In the figure, each sector of each block is examined in steps 402, 404 for its data type. If the data type is type 1, as determined in step 406, then, in step 408, the sector is copied to a different flash memory block that is marked as a type 1 block. If the data type is type 2, as determined in step 406, then in step 410, the sector is copied to yet a different flash memory block that is marked as a type 2 block. If the data is type 3 data, as determined in step 406, then, in step 412, the sector is not copied. In both steps 408 and 410, type 1 data and type 2 data that are copied are marked as type 3 data in the current block. As a result, at the conclusion of this process, all of the sectors of the current block will contain type 3 data and the current block will be an erasable block, i.e., type 3 block, and is marked as such in step 414. In one embodiment, the process for recovering flash memory blocks according to method 400 is carried out in the background, that is, independently of and without interfering with other tasks carried out by the logical block manager. The result is that blocks that are available to be erased and reused are marked as such for other logical block manager processes.

Figure 5:
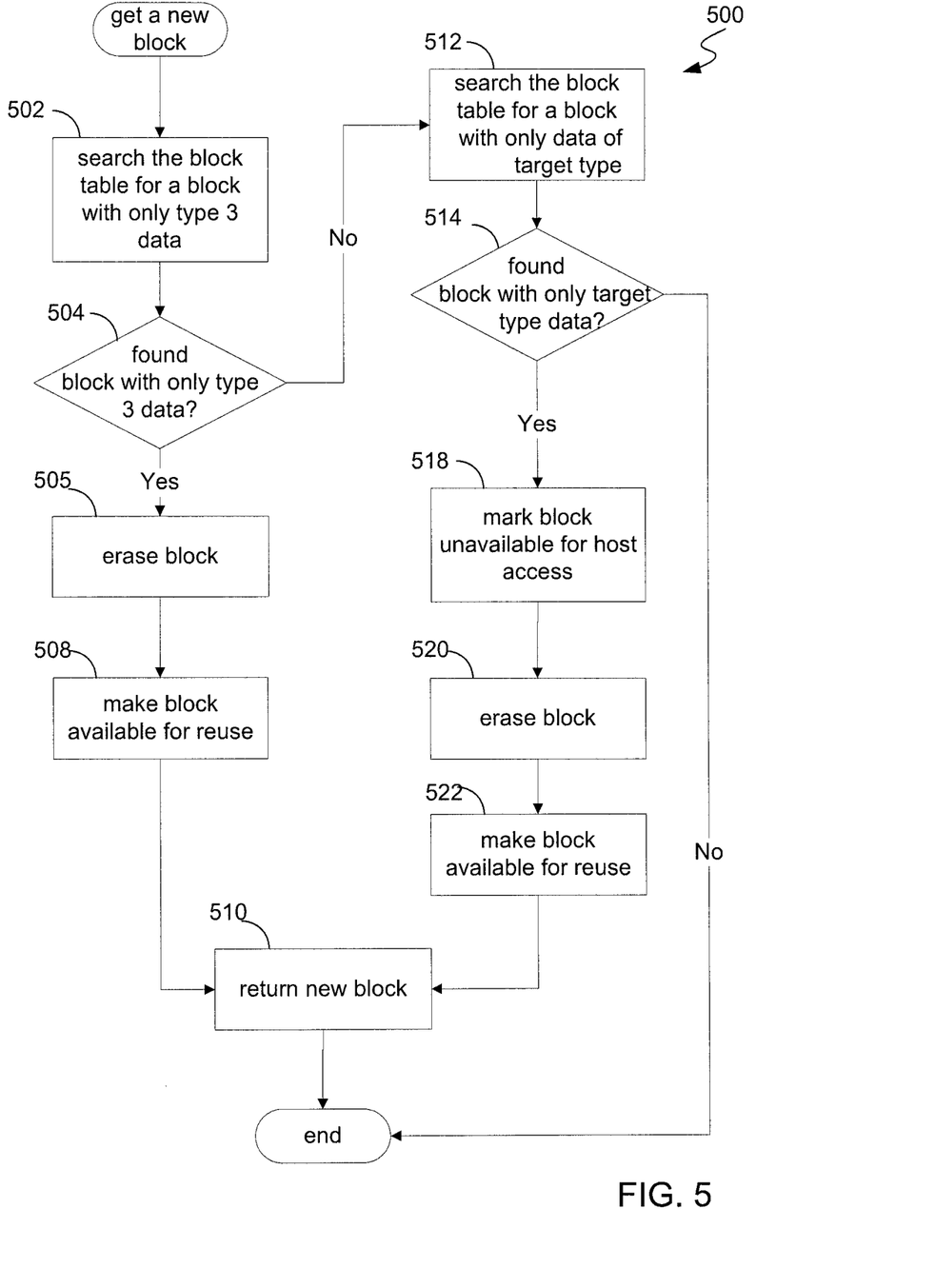
FIG. 5 depicts a flow chart of a method for getting a new block in accordance with the method of FIG. 4.

FIG. 5 depicts a method 500 for getting a new block, i.e., an erased block, in accordance with the embodiment of FIG. 4 or with the embodiment of FIG. 7 described below. If a new block is needed, then logical block manager 316 first searches, in step 502, for blocks containing type 3 data only, i.e., type 3 blocks. If a type 3 block is found, as determined in step 504, it erases the block in step 505, marks the block as available for use as a new block in step 508, and returns the new block in step 510. If no blocks containing only type 3 data are available as determined in step 504, then logical block manager 316 searches for blocks that contain data of a target type or group of types (e.g., type 2 data in the embodiment of FIG. 4; any combination of type 2 or type 3 data in the embodiment of FIG. 7) in step 512. When it finds such a block as determined in step 514, it marks it as unavailable for host accesses in step 518, erases the block in step 520, makes the block available for use as a new block in step 522, and returns the block in step 510. Because type 3 blocks are first considered for reuse before any type 2 blocks are considered, type 2 blocks are in a condition where they are available for host accesses until they are reclaimed in accordance with steps 518, 520, 522. This improves the hit rate and the write performance for the flash memory, as discussed below in reference to FIG. 8.

Figure 6:
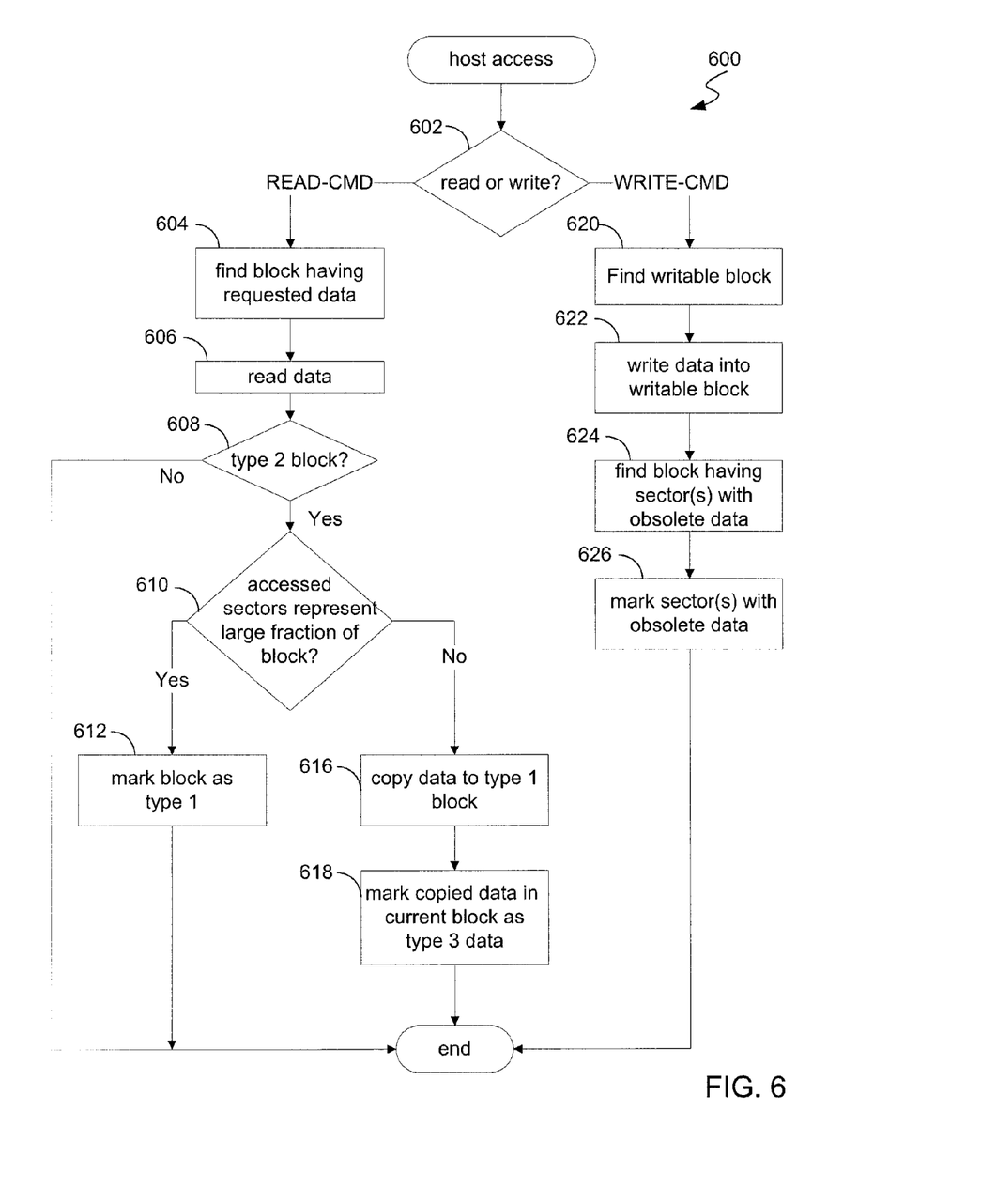
FIG. 6 depicts a flow chart for handling of host requests in accordance with the methods of FIGS. 4 and 5.

FIG. 6 depicts a method 600 for handling host access requests in accordance with the methods of FIGS. 4 and 5. In the figure, the type of host access is determined in step 602. If the host access is a read command, READ-CMD, the logical block manager finds the block having the requested data in step 604 and reads the sectors in the block that contain the requested data in step 606. As noted above, blocks that are type 1 and type 2 are available for host accesses and, in step 608, the logical block manager determines if the block found in step 604 is a type 1 or type 2 block. If the block found in step 604 is a type 1 block, method 600 terminates. On the other hand, if the block found in step 604 is a type 2 block, logical block manager 316 determines in step 610 whether the accessed sectors represent a large fraction of the block (e.g., >50%). If so, step 612 is executed where the block is marked as a type 1 block. Otherwise, the read data is copied into a type 1 block in step 616, and the data in the current block from which copying occurred is marked as type 3 data in step 618.

In FIG. 6, if the host access is a write command, WRITE-CMD, as determined in step 602, the logical block manager finds a writable block (which may be a newly erased block or an erased block with space for additional writes) in step 620 and writes the host data into the writable block in step 622. Logical block manager 316 then finds any blocks having one or more sectors containing data that became obsolete as a result of executing the WRITE-CMD in step 624. In step 626, all such sectors are marked as being obsolete, i.e., type 3 data. For example, if sectors 24 and 25 were written, any data at the old locations of sectors 24 and 25 (if they were previously contained in flash memory blocks) are marked as being obsolete.

Figure 7:
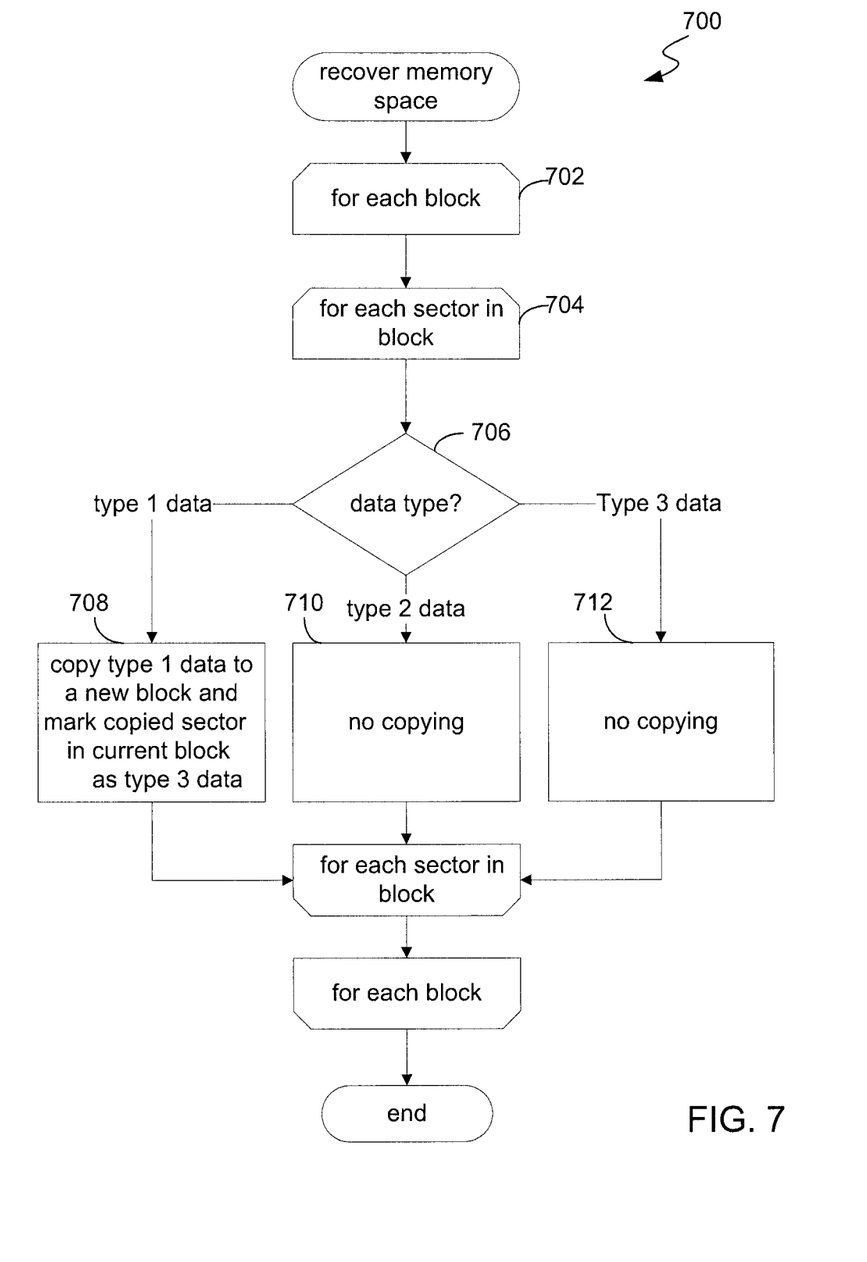
FIG. 7 depicts a flow chart of a method for recovering flash memory space according to a second embodiment.

FIG. 7 depicts a method 700 for recovering flash memory space according to a second embodiment. Method 700 is similar to method 400 except only type 1 data is copied into a new block, and type 2 data and type 3 data are not copied to a new block. By contrast, in method 400, type 1 data and type 2 data are copied into new blocks and only type 3 data is not copied to a new block.

In the block recovery process according to method 700, each sector of each block is examined in steps 702, 704 for its data type. If the data type is type 1, as determined in step 706, then, in step 708, the sector is copied to a different flash memory block that is marked as a type 1 block and type 1 data that is copied is marked as type 3 data in the current block. If the data type is type 2 or type 3, as determined in step 706, then according to steps 710, 712, the sector is not copied and is maintained in the current block. In one embodiment, the process for recovering flash memory blocks according to method 700 is carried out in the background, that is, independently of and without interfering with other tasks carried out by the logical block manager. The result is that blocks that are available to be erased and reused are marked as such for other logical block manager processes.

Figure 8:
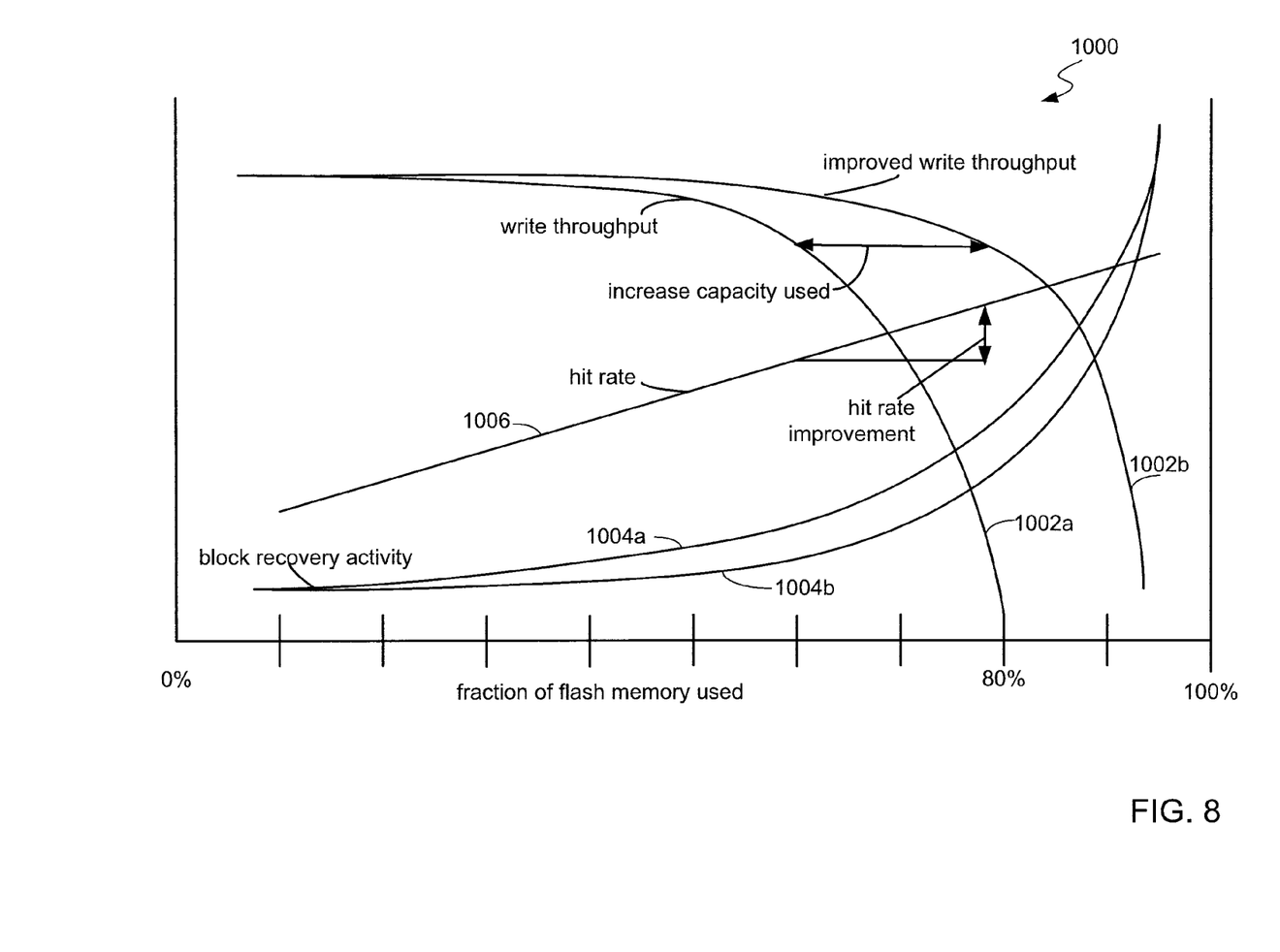
FIG. 8 depicts a graph of curves for the write throughput, block recovery activity, and hit rate.

FIG. 8 depicts a graph 1000 of curves for the write throughput 1002a, 1002b, block recovery activity 1004a, 1004b, and hit rate 1006. The graph depicts write throughput curves 1002a, 1002b that decrease as the fraction of the flash memory used increases, due to increased block recovery activity. The block recovery activity improves from that depicted in curve 1004a to that depicted in curve 1004b to sustain a higher write throughput. Identifying and managing three types of data, type 1, type 2, and type 3, instead of just type 1 and type 3 data, has the effect of improving write throughput from that depicted in curve 1002a to that depicted in curve 1002b due to improved block recovery depicted in curve 1004b The reason for the improved block recovery curve is that type 2 blocks are available to be recovered when needed by the block recovery process, but the block recovery activity does not actually occur until a block is needed, thus avoiding recovery costs recovering blocks unnecessarily. The presence of type 2 blocks also has the effect of improving hit rates as shown on hit rate curve 1006, because type 2 blocks are available for host read accesses. Thus, the presence of type 2 blocks has a double benefit, which comes from being able to operate at higher fractions of flash memory used without loss in write performance.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities. Usually, though not necessarily, these quantities may take the form of electrical and magnetic signals where they, or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also related to a device or an apparatus for performing these operations. The apparatus may be specially constructed for specific required purposes, or it may be a general purpose computer selectively activated or configured by a computer program stored in a computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data, which can thereafter be input to a computer system. Computer readable media may be based on any existing or subsequently developed technology for embodying computer programs in a manner that enables them to be read by a computer. Examples of a computer readable medium include a hard drive, networked attached storage (NAS), read-only memory, random access memory (e.g., flash memory device), a CD (Compact Disc), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing blocks of a hybrid drive including a non-volatile semiconductor memory device and a magnetic storage device, each of the blocks containing a plurality of sectors, the method comprising:
   tracking data types of data stored in each of the sectors of the blocks of the non-volatile semiconductor memory device, wherein the blocks include a first block containing first, second, and third sectors, and a second block containing fourth, fifth, and sixth sectors, the first and fourth sectors having data of a first data type stored therein, the second and fifth sectors having data of a second data type stored therein, and the third and sixth sectors having data of a third data type stored therein, and wherein the data of the first and second types are valid data and the data of the third type is invalid data; and
   collecting erasable blocks from the blocks of the non-volatile semiconductor memory device according to the data types of the data stored in the sectors, wherein the collected erasable blocks include sectors that have data of the second data type stored therein and sectors that have data of the third data type stored therein, and do not include any sector that has data of the first data type stored therein.

2. The method according to claim 1, wherein the collected erasable blocks include erasable blocks of a first category that include sectors having data of only the third data type stored therein and erasable blocks of a second category that include sectors having data of only the second data type stored therein.

3. The method according to claim 2, wherein said collecting includes:
   copying data of the first data type from the blocks of the non-volatile semiconductor memory device to a first erased block of the non-volatile semiconductor memory device; and
   copying data of the second data type from the blocks of the non-volatile semiconductor memory device to a second erased block of the non-volatile semiconductor memory device.

4. The method according to claim 2, further comprising:
   erasing the collected erasable blocks of the non-volatile semiconductor memory device.

5. The method according to claim 4, wherein the collected erasable blocks of the first category are erased before the collected erasable blocks of the second category are erased.

6. The method of claim 2, further comprising:
   reading data from an erasable block of the second category that includes sectors having data of the second data type stored therein;
   determining the combined size of the sectors having data of the second data type stored therein;
   comparing the combined size of the sectors having data of the second data type stored therein to a threshold; and
   marking the erasable block of the second category as non-erasable if the combined size of the sectors having data of the second data type stored therein is greater than the threshold.

7. The method of claim 2, further comprising:
   reading data from an erasable block of the second category that includes sectors having data of the second data type stored therein;
   determining the combined size of the sectors having data of the second data type stored therein;
   comparing the combined size of the sectors having data of the second data type stored therein to a threshold;
   copying the data read to a block of the non-volatile semiconductor memory device that is of a non-erasable type if the combined size of the sectors having data of the second data type stored therein is less than the threshold; and
   marking one or more sectors in the erasable block having data of the second data type stored therein as containing data of the third data type.

8. The method of claim 1, further comprising:
   writing data to a block of the non-volatile semiconductor memory device that is of a non-erasable category; and
   marking one or more sectors in a different block as containing data of the third data type.

9. The method of claim 1, wherein the data of the first data type is valid data that cannot be erased without first copying to a different block, and the data of the second data type is valid data that can be erased without first copying to a different block.

10. A hybrid drive, comprising:
- a non-volatile semiconductor memory device partitioned into blocks, each of the blocks containing a plurality of sectors;
- a magnetic storage device; and
- a controller configured to track data types of data stored in each of the sectors of the blocks of the non-volatile semiconductor memory device, wherein the blocks include a first block containing first, second, and third sectors, and a second block containing fourth, fifth, and sixth sectors, the first and fourth sectors having data of a first data type stored therein, the second and fifth sectors having data of a second data type stored therein, and the third and sixth sectors having data of a third data type stored therein, and wherein the data of the first and second types are valid data and the data of the third type is invalid data, and to collect erasable blocks from the blocks of the non-volatile semiconductor memory device according to the data types of the data stored in the sectors,
- wherein the collected erasable blocks include sectors that have data of the second data type stored therein and sectors that have data of the third data type stored therein, and do not include any sector that has data of the first data type stored therein.

11. The hybrid drive according to claim 10, wherein the collected erasable blocks include erasable blocks of a first category that include sectors having data of only the third data type stored therein and erasable blocks of a second category that include sectors having data of only the second data type stored therein.

12. The hybrid drive according to claim 11, wherein collecting the erasable blocks includes
- copying data of the first data type from the blocks of the non-volatile semiconductor memory device to a first erased block of the non-volatile semiconductor memory device, and
- copying data of the second data type from the blocks of the non-volatile semiconductor memory device to a second erased block of the non-volatile semiconductor memory device.

13. The hybrid drive according to claim 11, wherein the controller is configured to erase the collected erasable blocks of the non-volatile semiconductor memory device.

14. The hybrid drive according to claim 13, wherein the collected erasable blocks of the first category are erased before the collected erasable blocks of the second category are erased.

15. The hybrid drive of claim 11, wherein the controller is configured to
- read data from an erasable block of the second category that includes sectors having data of the second data type stored therein,
- determine the combined size of the sectors having data of the second data type stored therein,
- compare the combined size of the sectors having data of the second data type stored therein to a threshold, and
- mark the erasable block of the second category as non-erasable if the combined size of the sectors having data of the second data type stored therein is greater than the threshold.

16. The hybrid drive of claim 11, wherein the controller is configured to
- read data from an erasable block of the second category that includes sectors having data of the second data type stored therein,
- determine the combined size of the sectors having data of the second data type stored therein,
- compare the combined size of the sectors having data of the second data type stored therein to a threshold,
- copy the read data to a block of the non-volatile semiconductor memory device that is of a non-erasable type if the combined size of the sectors having data of the second data type stored therein is less than the threshold, and
- mark one or more sectors in the erasable block having data of the second data type stored therein as containing data of the third data type.

17. The hybrid drive of claim 10, wherein the controller is configured to
- write data to a block of the non-volatile semiconductor memory device that is of a non-erasable category, and
- mark one or more sectors in a different block as containing data of the third data type.

18. The hybrid drive of claim 10, wherein the data of the first data type is valid data that cannot be erased without first copying to a different block, and the data of the second data type is valid data that can be erased without first copying to a different block.

* * * * *